United States Patent
Wang et al.

(10) Patent No.: US 9,945,070 B2
(45) Date of Patent: Apr. 17, 2018

(54) PROCESS OF MANUFACTURING ARTIFICIAL LEATHER

(71) Applicants: Mao-Yen Wang, Changhua (TW); Tzu-Te Liu, New Taipei (TW)

(72) Inventors: Mao-Yen Wang, Changhua (TW); Tzu-Te Liu, New Taipei (TW)

( * ) Notice: Subject to any disclaimer, the term of this patent is extended or adjusted under 35 U.S.C. 154(b) by 242 days.

(21) Appl. No.: 14/997,571

(22) Filed: Jan. 18, 2016

(65) Prior Publication Data
US 2016/0130749 A1 May 12, 2016

(51) Int. Cl.
| B32B 33/00 | (2006.01) |
| D06N 3/14 | (2006.01) |
| D06N 3/04 | (2006.01) |
| D06N 3/00 | (2006.01) |
| D06N 7/00 | (2006.01) |
| B32B 38/10 | (2006.01) |

(52) U.S. Cl.
CPC .............. *D06N 3/14* (2013.01); *D06N 3/004* (2013.01); *D06N 3/0043* (2013.01); *D06N 3/0075* (2013.01); *D06N 3/0097* (2013.01); *D06N 3/042* (2013.01); *D06N 7/0097* (2013.01); *B32B 38/10* (2013.01)

(58) Field of Classification Search
USPC ........................... 428/90, 96, 97; 156/79, 239
See application file for complete search history.

(56) References Cited

U.S. PATENT DOCUMENTS

| 3,939,021 | A | * | 2/1976 | Nishibayashi | D06N 3/005 156/239 |
| 4,102,719 | A | * | 7/1978 | Fujii | B32B 5/20 156/231 |
| 4,808,458 | A | * | 2/1989 | Watt | B32B 27/12 427/200 |
| 6,159,581 | A | * | 12/2000 | Yoneda | A63L 371/146 347/105 |
| 6,764,564 | B2 | * | 7/2004 | Chou | B29B 7/7668 156/243 |
| 7,662,461 | B2 | * | 2/2010 | Xia | B32B 7/12 428/160 |
| 7,670,517 | B2 | * | 3/2010 | Tadokoro | B32B 5/20 264/45.5 |
| 2003/0022575 | A1 | * | 1/2003 | Yoneda | A43B 1/00 442/104 |
| 2008/0106006 | A1 | * | 5/2008 | Fraillon | B29C 51/16 264/571 |
| 2014/0147635 | A1 | * | 5/2014 | Feng | H05K 5/0243 428/160 |

\* cited by examiner

*Primary Examiner* — Nina Bhat

(57) ABSTRACT

A process of manufacturing an artificial leather in one embodiment includes adhering a substrate onto a release cloth; flocking the substrate to form fur thereon; applying a synthetic resin to the substrate and drying same to form a half-finished artificial leather; foaming the half-finished artificial leather to fill interstices of the fur with the synthetic resin; sanding the half-finished artificial leather to remove excessive synthetic resin from the half-finished artificial leather; coloring the half-finished artificial leather to form a velvet-like surface; and removing the release cloth from the half-finished artificial leather to produce a finished artificial leather.

1 Claim, 5 Drawing Sheets

PROCESS OF MANUFACTURING ARTIFICIAL LEATHER

BACKGROUND OF THE INVENTION

1. Field of the Invention

The invention relates to the production of synthetic leather materials and more particularly to a process of manufacturing artificial leather having a velvet-like surface.

2. Description of Related Art

It is known to produce synthetic polymeric sheet materials simulating the appearance of natural leather. Such synthetic leather materials often are formed by coating or laminating a reinforcing substrate, such as woven, nonwoven, or knit textile fabric, with synthetic resinous polymers. Conventional art is replete with disclosures of various combinations of such polymeric components to provide particular characteristics for a desired end use of the products.

While the conventional art enjoys its success in the market, continuing improvements in the exploitation of process of manufacturing artificial leather are constantly sought.

SUMMARY OF THE INVENTION

It is therefore one object of the invention to provide a process of manufacturing an artificial leather comprising adhering a substrate onto a release cloth; flocking the substrate to form fur thereon; applying a synthetic resin to the substrate and drying same to form a half-finished artificial leather; foaming the half-finished artificial leather to fill interstices of the fur with the synthetic resin; sanding the half-finished artificial leather to remove excessive synthetic resin from the half-finished artificial leather; coloring the half-finished artificial leather to form a velvet-like surface; and removing the release cloth from the half-finished artificial leather to produce a finished artificial leather.

The above and other objects, features and advantages of the invention will become apparent from the following detailed description taken with the accompanying drawings.

DETAILED DESCRIPTION OF THE INVENTION

Figure 1:
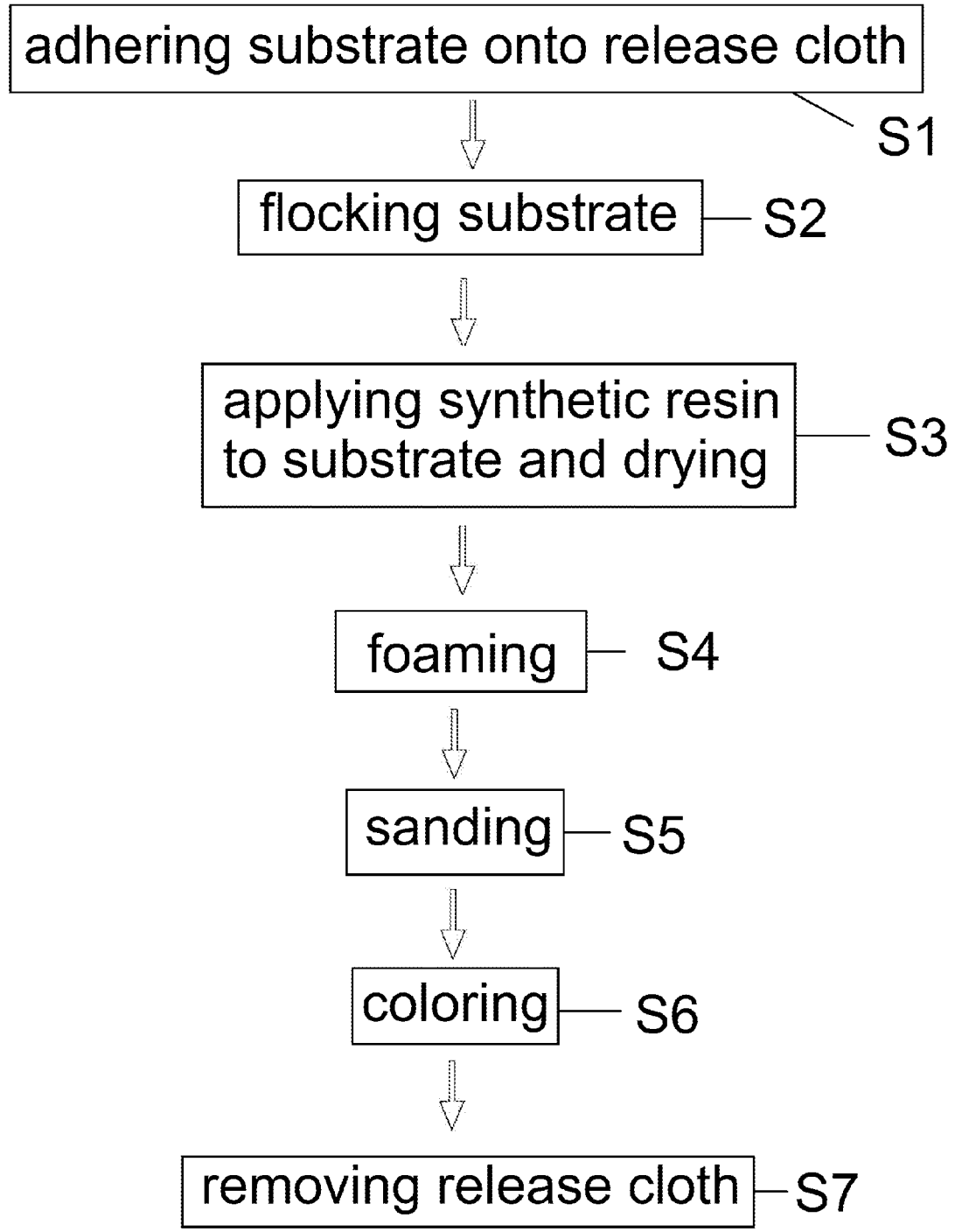
FIG. 1 is a flow chart illustrating a process of manufacturing artificial leather according to a first preferred embodiment of the invention.

Referring to FIG. 1, a process of manufacturing artificial leather in accordance with a first preferred embodiment of the invention comprises step S1 of adhering a substrate (e.g., polyurethane (PU) foam film) onto a release cloth 1A, step S2 of covering the substrate 1 with fur 2 by flocking the substrate 1 with microfiber powder, step S3 of applying a synthetic resin (e.g., PU resin or acrylic resin) 3 to the substrate 1 and drying same to form a half-finished artificial leather having the fur 2, step S4 of foaming the half-finished artificial leather to fill interstices of the fur 2 with the synthetic resin 3, step S5 of sanding the fur 2 to remove excessive synthetic resin 3 from the half-finished artificial leather, step S6 of coloring the half-finished artificial leather to produce a velvet-like top surface, and step S7 of removing the release cloth 1A from the half-finished artificial leather. As a result, an artificial leather having a nubuck-like leather appearance is produced.

The step S4 of foaming can be done by heating or not.

Figure 2A:
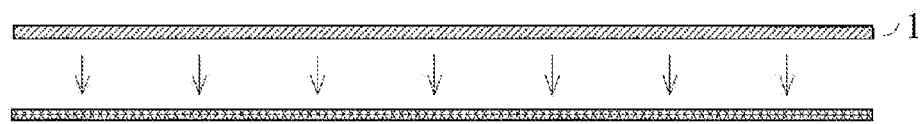
FIG. 2A schematically depicts action corresponding to step S1.

Referring to FIG. 2A, it schematically depicts action corresponding to step S1.

Figure 2B:
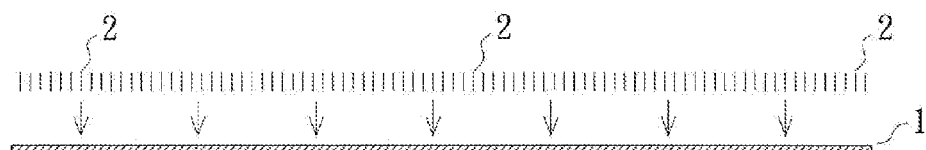
FIGS. 2B and 2C schematically depict actions corresponding to step S2.
Figure 2C:
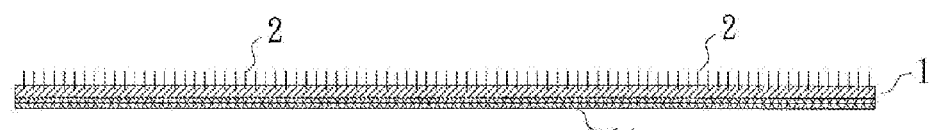

Referring to FIG. 2B and FIG. 2C, they schematically depict actions corresponding to step S2.

Figure 2D:
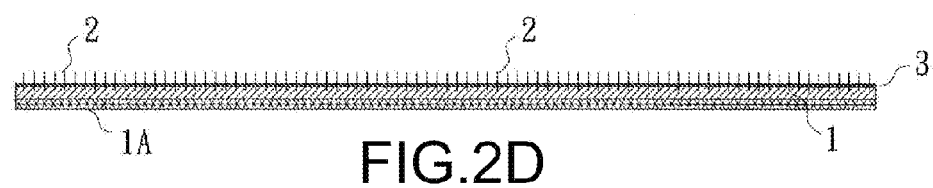
FIG. 2D schematically depicts action corresponding to step S3.

Referring to FIG. 2D, it schematically depicts action corresponding to step S3.

Figure 2E:
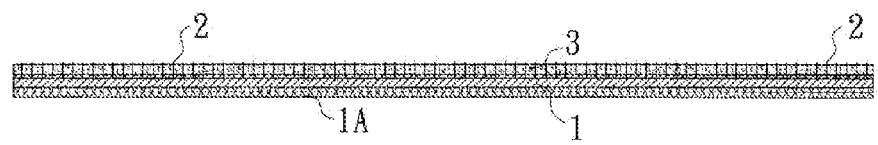
FIG. 2E schematically depicts action corresponding to step S4.

Referring to FIG. 2E, it schematically depicts action corresponding to step S4.

Figure 2F:
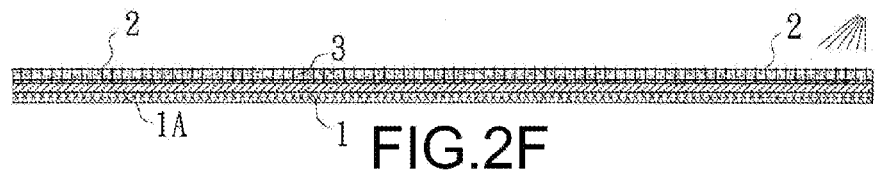
FIG. 2F schematically depicts action corresponding to step S5.

Referring to FIG. 2F, it schematically depicts action corresponding to step S5.

Figure 2G:
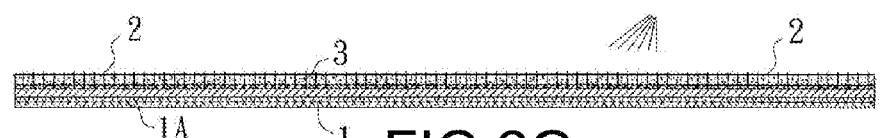
FIG. 2G schematically depicts action corresponding to step S6.

Referring to FIG. 2G, it schematically depicts action corresponding to step S6.

Figure 2H:
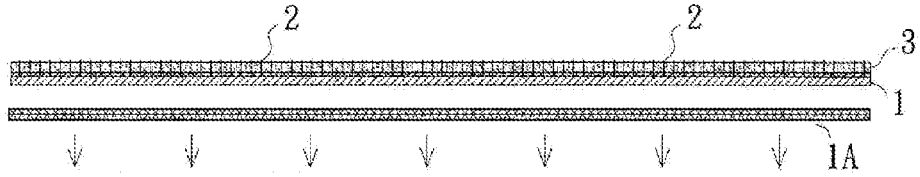
FIG. 2H schematically depicts actions corresponding to step S7.

Referring to FIG. 2H, it schematically depicts action corresponding to step S7.

Figure 3:
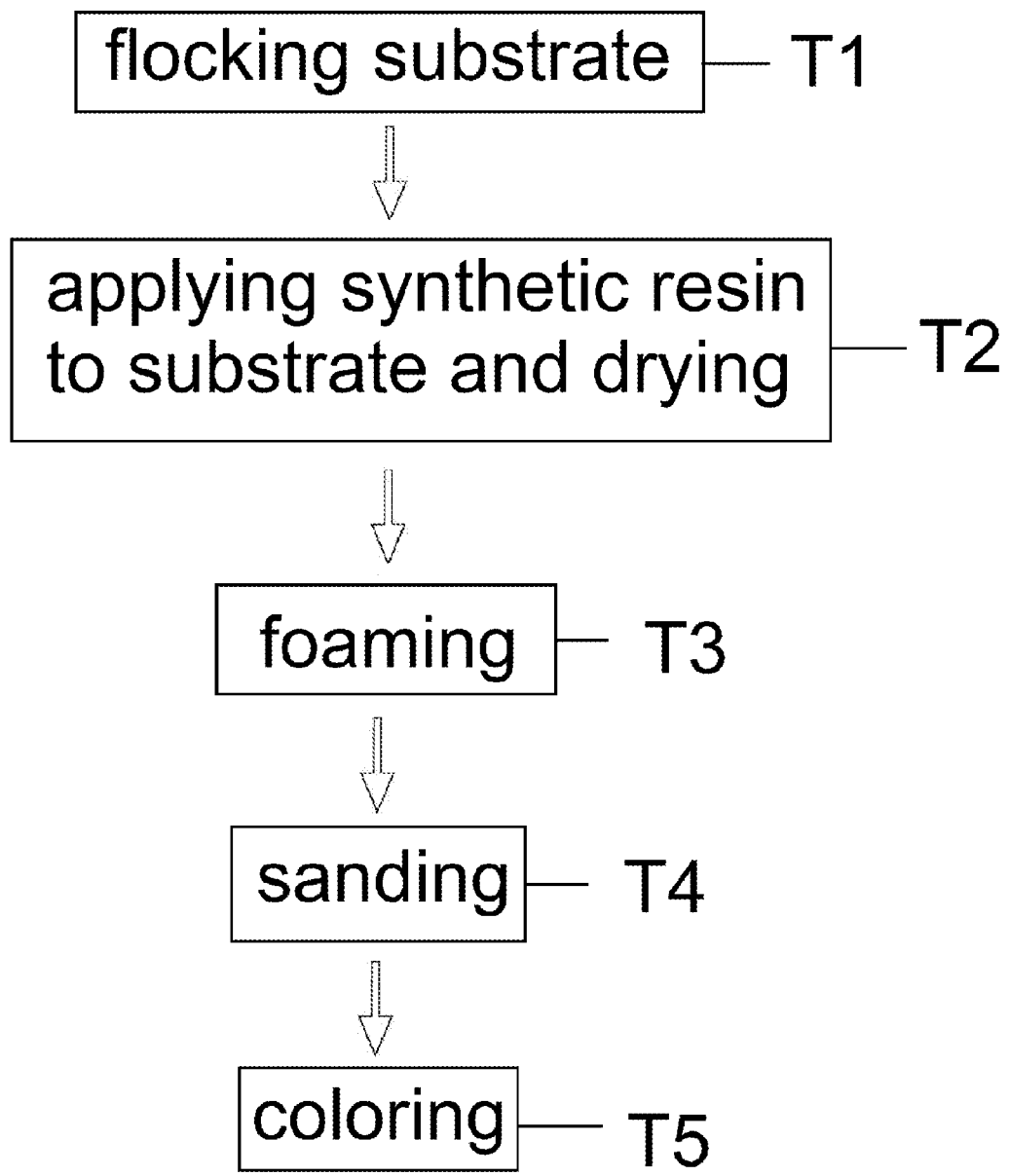
FIG. 3 is a flow chart illustrating a process of manufacturing artificial leather according to a second preferred embodiment of the invention.

Referring to FIG. 3, a process of manufacturing artificial leather in accordance with a second preferred embodiment of the invention comprises step T1 of covering a substrate 1 with fur 2 by flocking the substrate 1 with microfiber powder, step T2 of applying a synthetic resin (e.g., PU resin or acrylic resin) 3 to the substrate 1 and drying same to form a half-finished artificial leather having the fur 2, step T3 of foaming the half-finished artificial leather to fill interstices of the fur 2 with the synthetic resin 3, step T4 of sanding the fur 2 to remove excessive synthetic resin 3 from the half-finished artificial leather, and step T5 of coloring the half-finished artificial leather to produce a velvet-like top surface. As a result, an artificial leather having a nubuck-like leather appearance is produced.

The step T3 of foaming can be done by heating or not.

Preferably, the substrate 1 is non-woven fabric with PU resin.

Preferably, the substrate 1 is woven fabric with polyvinyl chloride (PVC) resin.

Preferably, the substrate 1 is microfiber non-woven fabric with PU resin.

Figure 4A:
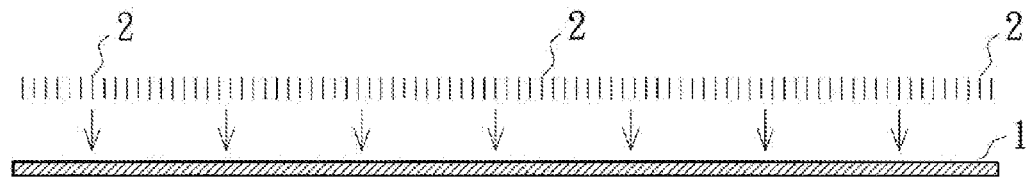
FIG. 4A schematically depicts action corresponding to step T1.
Figure 4B:
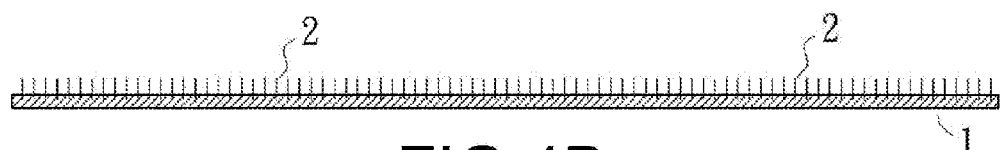
FIG. 4B and FIG. 4C schematically depict actions corresponding to step T2.

Referring to FIG. 4A and FIG. 4B, they schematically depict actions corresponding to step T1.

Figure 4C:
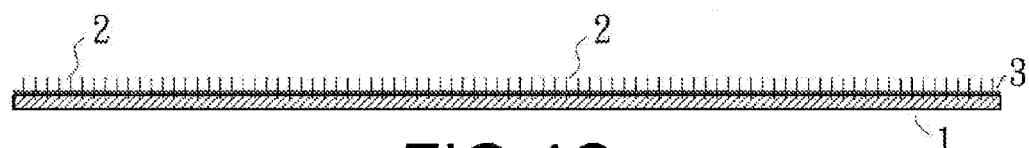

Referring to FIG. 4C, it schematically depicts action corresponding to step T2.

Figure 4D:
FIG. 4D schematically depicts action corresponding to step T3.

Referring to FIG. 4D, it schematically depicts action corresponding to step T3.

Figure 4E:
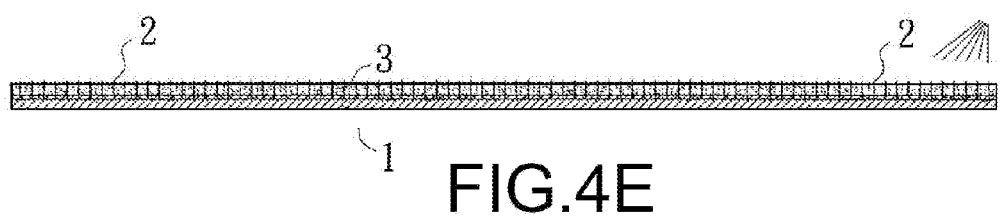
FIG. 4E schematically depicts action corresponding to step T4.

Referring to FIG. 4E, it schematically depicts action corresponding to step T4.

Figure 4F:
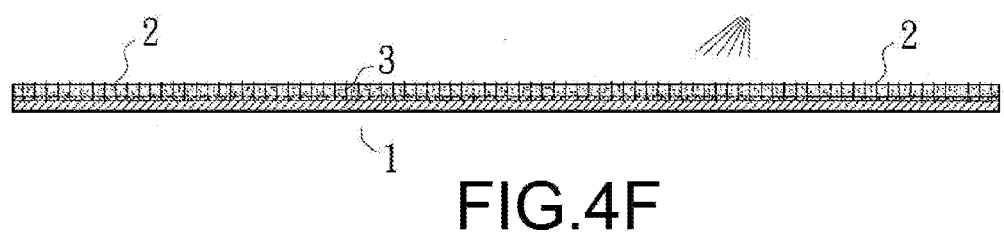
FIG. 4F schematically depicts action corresponding to step T5.

Referring to FIG. 4F, it schematically depicts action corresponding to step T5.

Figure 5:
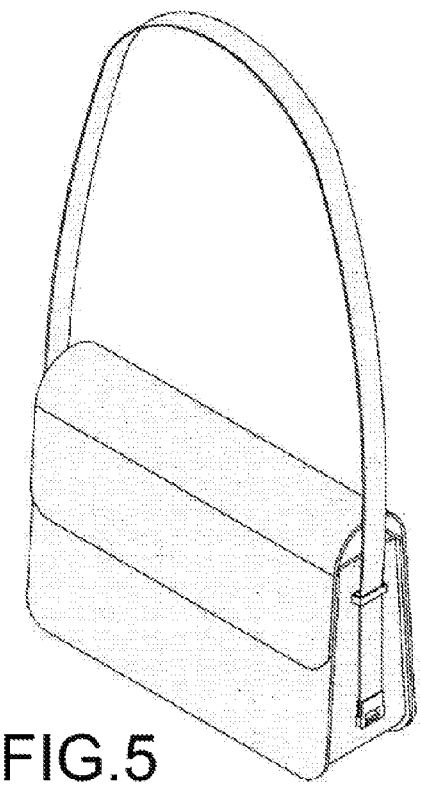
FIG. 5 is a perspective of a handbag having a vamp made of the artificial leather of the invention.

Referring to FIG. 5, a handbag having a vamp made of the artificial leather of the invention is shown.

Figure 6:
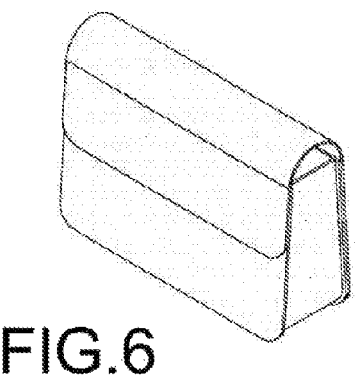
FIG. 6 is a perspective of a purse having a vamp made of the artificial leather of the invention.

Referring to FIG. 6, a purse having a vamp made of the artificial leather of the invention is shown.

Figure 7:
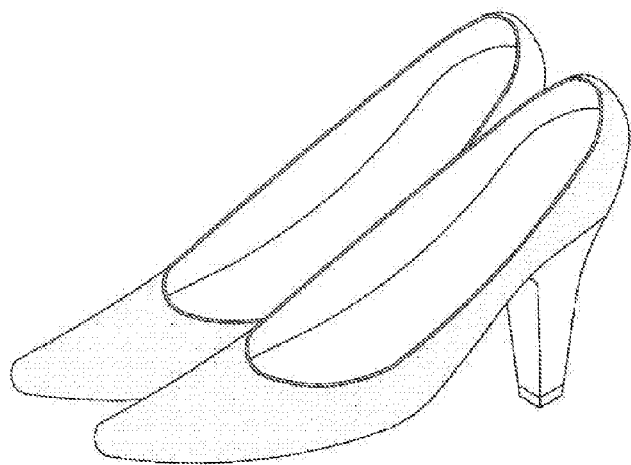
FIG. 7 is a perspective of a pair of high-heeled shoes having a vamp made of the artificial leather of the invention.

Referring to FIG. 7, a pair of high-heeled shoes each having a vamp made of the artificial leather of the invention is shown.

Figure 8:
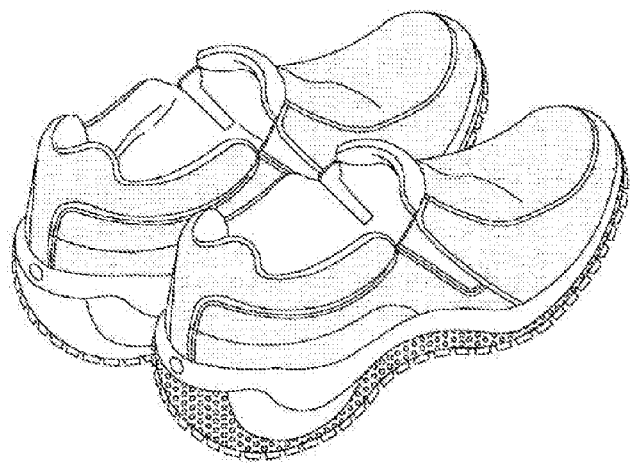
FIG. 8 is a perspective of a pair of sneakers having a vamp made of the artificial leather of the invention.

Referring to FIG. 8, a pair of sneakers each having a vamp made of the artificial leather of the invention is shown.

While the invention has been described in terms of preferred embodiments, those skilled in the art will recognize that the invention can be practiced with modifications within the spirit and scope of the appended claims.

What is claimed is:

1. A process of manufacturing an artificial leather comprising the steps of:
  adhering a substrate onto a release cloth;
  flocking the substrate to form fur thereon;
  applying a synthetic resin to the substrate and drying same to form a half-finished artificial leather;
  heating the half-finished artificial leather to fill interstices of the fur with the synthetic resin;
  sanding the half-finished artificial leather to remove excessive synthetic resin from the half-finished artificial leather;
  coloring the half-finished artificial leather to form a velvet surface; and
  removing the release cloth from the half-finished artificial leather to produce a finished artificial leather.

* * * * *